US008822906B2

(12) United States Patent
Yuan et al.

(10) Patent No.: US 8,822,906 B2
(45) Date of Patent: Sep. 2, 2014

(54) MULTICHANNEL OPTICAL POWER METER USING FREE SPACE BEAM SAMPLING

(75) Inventors: Shifu Yuan, Camarillo, CA (US); Roger Jonathan Helkey, Santa Barbara, CA (US); Nitin Kataria, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 228 days.

(21) Appl. No.: 13/296,126

(22) Filed: Nov. 14, 2011

(65) Prior Publication Data

US 2013/0119243 A1 May 16, 2013

(51) Int. Cl.
*G01J 1/10* (2006.01)
*G02B 26/10* (2006.01)
*G01J 1/04* (2006.01)
*G01J 1/42* (2006.01)
*G01J 1/02* (2006.01)

(52) U.S. Cl.
CPC .............. *G01J 1/04* (2013.01); *G01J 1/0414* (2013.01); *G01J 1/0403* (2013.01); *G01J 1/0425* (2013.01); *G01J 1/4257* (2013.01); *G01J 1/0271* (2013.01); *G01J 1/0228* (2013.01)
USPC ................. 250/227.26; 250/227.11; 250/235

(58) Field of Classification Search
USPC ............. 250/227.26, 227.11, 227.14, 227.21, 250/216, 235; 356/73.1; 385/12, 911
See application file for complete search history.

(56) References Cited

U.S. PATENT DOCUMENTS

| | | | |
|---|---|---|---|
| 6,819,815 B1 * | 11/2004 | Corbalis et al. ................. | 385/16 |
| 7,111,993 B2 * | 9/2006 | Mori ............................... | 385/88 |
| 7,676,125 B2 * | 3/2010 | Zheng et al. .................... | 385/18 |

* cited by examiner

*Primary Examiner* — Georgia Y Epps
*Assistant Examiner* — Carolynn A Moore
(74) *Attorney, Agent, or Firm* — SoCal IP Law Group LLP; John E. Gunther; Steven C. Sereboff

(57) ABSTRACT

An optical device and method providing multi-channel bulk optical power monitoring is disclosed. The device and method may include a scanning mirror, a plurality of input optical fibers, a plurality of output optical fibers, and at least one sample optical fiber optically connected to a photodetector. The device and method may further include a first reflective surface and a second reflective surface. The first reflective surface may reflect light from the input optical fibers to the second reflective surface. The second reflective surface may reflect a first portion of the light into the output optical fibers and pass a second portion of the light to the scanning mirror. The scanning mirror may reflect samples of the second portion of the light into the at least one sample optical fiber.

15 Claims, 13 Drawing Sheets

MULTICHANNEL OPTICAL POWER METER USING FREE SPACE BEAM SAMPLING

FIELD OF THE INVENTION

This invention relates to optical monitoring and more particularly to systems and methods for measuring optical power on multiple optical fibers using free-space time domain multiplexing.

BACKGROUND OF THE INVENTION

In optical networks, it may be desirable to monitor the optical power in multiple optical fibers. In the past, power monitoring has been performed by individually tapping each fiber using a dedicated fiber tap coupler. A fiber tap coupler is a relatively inexpensive component. However, when hundreds of fiber tap couplers are integrated into an optical system, certain disadvantages arise.

For example, installation of hundreds of fiber tap couplers requires significant labor. Additionally, hundreds of fiber tap couplers require significant space and limit how small a corresponding component may be manufactured. Moreover, when multiplied hundreds of times, the cost of a fiber tap coupler may become a controlling factor in the cost of the corresponding component. Accordingly, what is needed is a compact, low cost solution for optical tap power monitoring.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
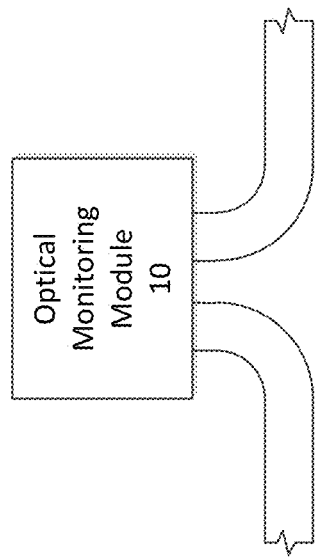
FIG. 1 is a schematic block diagram of an optical monitoring module.

Referring to FIG. 1, an optical monitoring module 10 in accordance with the present invention may support or provide multi-channel, bulk, optical power monitoring. A monitoring module 10 may monitor the optical power of multiple fibers using photodetectors. The number of photodetectors within a monitoring module 10 may be significantly less than the number of optical fibers being monitored. Accordingly, a monitoring module 10 may be less expensive and more compact than prior power monitoring devices.

Figure 2:
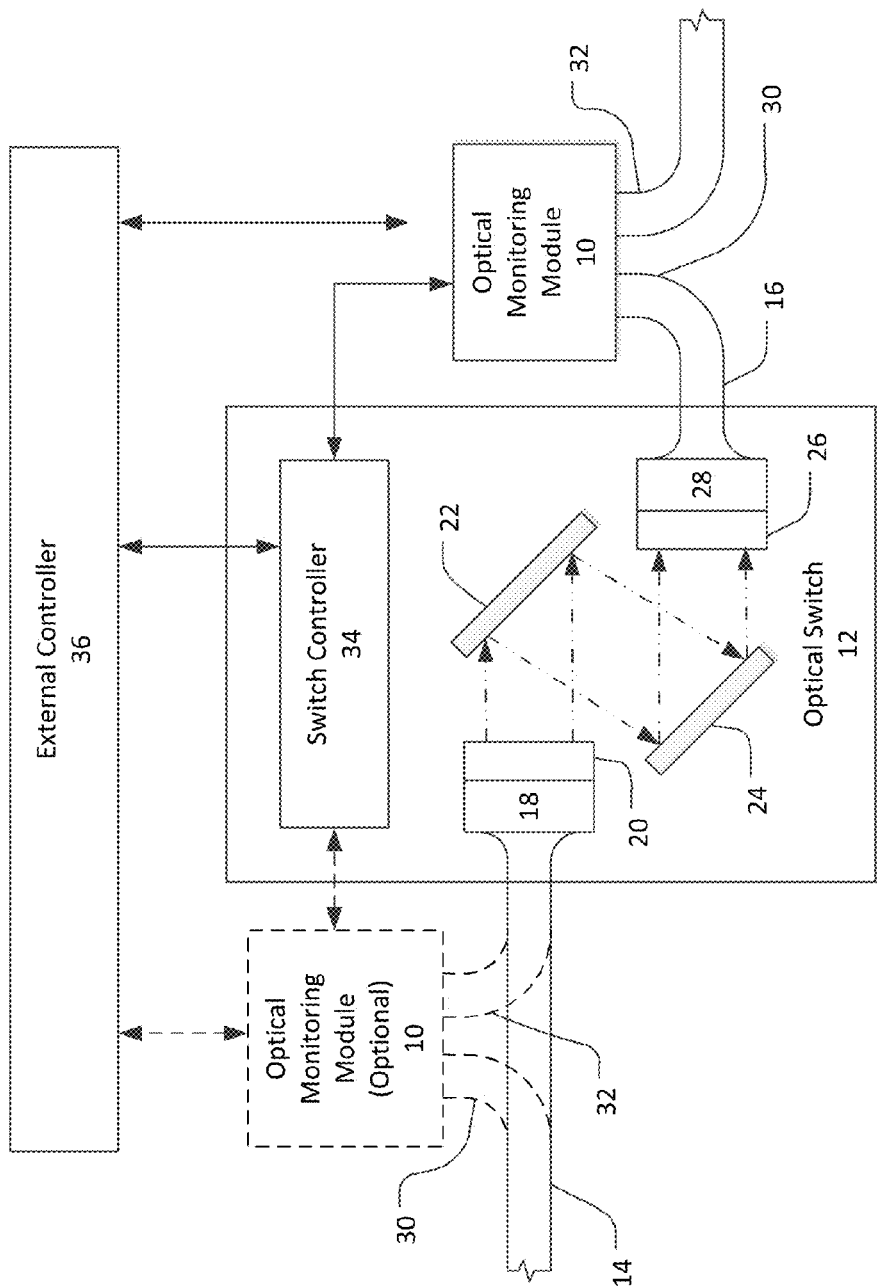
FIG. 2 is a schematic block diagram of an optical monitoring module operating in conjunction with one embodiment of an optical switch.

Referring to FIG. 2, an optical monitoring module 10 may be used in a variety of optical systems and in a variety of ways. In selected embodiments or systems, a monitoring module 10 may be coupled to an optical switch 12. An optical switch 12 may be used in an optical network to switch light beams from input optical fibers 14 to output optical fibers 16. A monitoring module 10 may be coupled to an optical switch 12 of any suitable configuration. In certain embodiments, a monitoring module 10 may be coupled to an optical switch 12 having an input fiber block 18, an input lens plate 20 or assembly 20, an array 22 of pivoting input mirrors, an array 24 of pivoting output mirrors, an output lens plate 26 or assembly 26, and an output fiber block 28.

The input and output fiber blocks 18, 28 may each include a plurality of apertures extending therethrough. Each fiber of the input fibers 14 may be inserted into a corresponding aperture in the input fiber block 18 until it reaches the opposing side thereof. Similarly, each fiber of the output fibers 16 may be inserted into a corresponding aperture in the output fiber block 28 until it reaches the opposing side thereof.

The input and output lens plates 20, 26 may each include a plurality of lenses. For example, an input lens plate 20 may include a plurality of collimating lenses. The input lens plate 20 may be mounted to the input fiber block 18 such that each collimating lens is located optically over the end of a corresponding input optical fiber 14. Similarly, an output lens plate 26 may include a plurality of focusing lenses. The output lens plate 26 may be mounted to the output fiber block 28 such that each focusing lens is located optically over the end of a corresponding output optical fiber 16.

The input and output mirror arrays 22, 24 may each include a substrate supporting a plurality of mirrors. Each of the mirrors may be pivotally secured to the corresponding substrate to enable two-dimensional pivoting. In selected embodiments, electrostatic actuators may be located in the respective substrates. A voltage may be applied to each of the electrostatic actuators to produce a desired pivoting of a corresponding mirror.

In operation, a light beam may be propagated through an input fiber 14. The light beam may be radiated from the end of the input fiber 14 through the input lens plate 20 or assembly 20. The input lens plate 20 or assembly 20 may collimate the light beam. Thus, a collimated light beam may reach a particular input mirror of the input array 22.

By pivoting the particular input mirror of the input array 22, the light beam may be reflected onto a particular output mirror of the output array 24. Pivoting of the particular output mirror may result in the light beam being reflected into a particular output fiber 16. For example, an output mirror may reflect the light beam onto a particular lens located within the output lens plate 26. The particular lens may then pass (e.g., focus) the light beam into the particular output fiber 16.

Accordingly, one input pivoting mirror may be located in the path of each light beam being propagated by a corresponding input fiber 14. The input pivoting mirror may pivot relative to a mirror substrate to alter an angle at which the light beam is reflected therefrom. The angle may be controlled so that the light beam falls on a desired output pivoting mirror in line with a respective output fiber 16 to which the light beam is to be switched.

The efficiency on an optical switch 12 may degrade with changes in temperature, vibrations, the passage of time, and the like. For example, with the passage of time, the same voltage may not produce the same deflection of a mirror about a particular axis. Resulting misalignments may reduce the amount of light (i.e., optical power) passing from a particular input fiber 14 to a corresponding output fiber 16. In selected applications, such reductions may be undesirable or unacceptable.

In other embodiments, selective reductions in optical power may be desirable, so long as they are controlled. For example, as disclosed in U.S. Pat. No. 7,127,137 (hereby incorporated by reference), controlled loss within an optical switch may be used to equalize optical power across a plurality of optical signals. Loss may be increased by detuning one or more mirrors away from an optimum angle associated with minimum loss.

Regardless whether a particular optical loss within a switch 12 is desirable or undesirable, feedback may assist in controlling or minimizing that optical loss. In selected embodiments, a monitoring module 10 in accordance with the present invention may provide that feedback.

For example, in selected embodiments, a monitoring module 10 may monitor the optical power within the output fibers 16. In such embodiments, the output fibers 16 of an optical switch 12 may be the input optical fibers 30 for the monitoring module 10. Accordingly, the output optical fibers 32 of the monitoring module 10 may conduct light signals on to subsequent components and customers.

A monitoring module 10 positioned downstream from an optical switch 12 may provide data quantifying the optical power within the various output fibers 16. This data may be passed to a switch controller 34 located within the optical switch 12. Alternatively, or in addition thereof, the data may be passed to one or more external controllers 36 (e.g., controllers located remotely within a network monitoring center). Acting autonomously or under the direction of an external controller 36, a switch controller 34 may use the data to make adjustments to the operation of the switch 12.

For example, a switch controller 34 may use the data to support a routine seeking to maximize the optical power output in a particular output fiber 16. The routine may manipulate the voltage delivered to certain electrostatic actuators and watch how that manipulation changes the optical power being reported (by the monitoring module 12) for that particular output fiber 16. Alternatively, a switch controller 34 may use the data to equalize optical power across a plurality of optical signals.

In certain applications, it may be desirable to quantify the optical power within the various input fibers 14. Such data may assist in identifying the maximum optical power obtainable for each of the various output fibers 16. To collect the data, a monitoring module 10 in accordance with the present invention may be positioned to monitor the input fibers 14. In such embodiments, the output fibers 32 of the monitoring module 10 may be the input fibers 14 for the optical switch 12. Accordingly, the input fibers 30 of the monitoring module 10 may deliver thereto the light signals from previous components and providers.

Hereinabove, a monitoring module 10 in accordance with the present invention has been described as operating in conjunction with a particular kind of optical switch 12. However, it should be noted that a monitoring module 10 may operate in conjunction with other types of switches. It should also be noted that a monitoring module 10 need not operate solely in conjunction with a switch 12. For example, a monitoring module 10 may be used in other feedback and control applications or for dynamic testing of live systems. Accordingly, the foregoing description is not intended to limit the scope of the invention, as claimed, but is merely representative of certain examples of presently contemplated embodiments in accordance with the invention.

Figure 3:
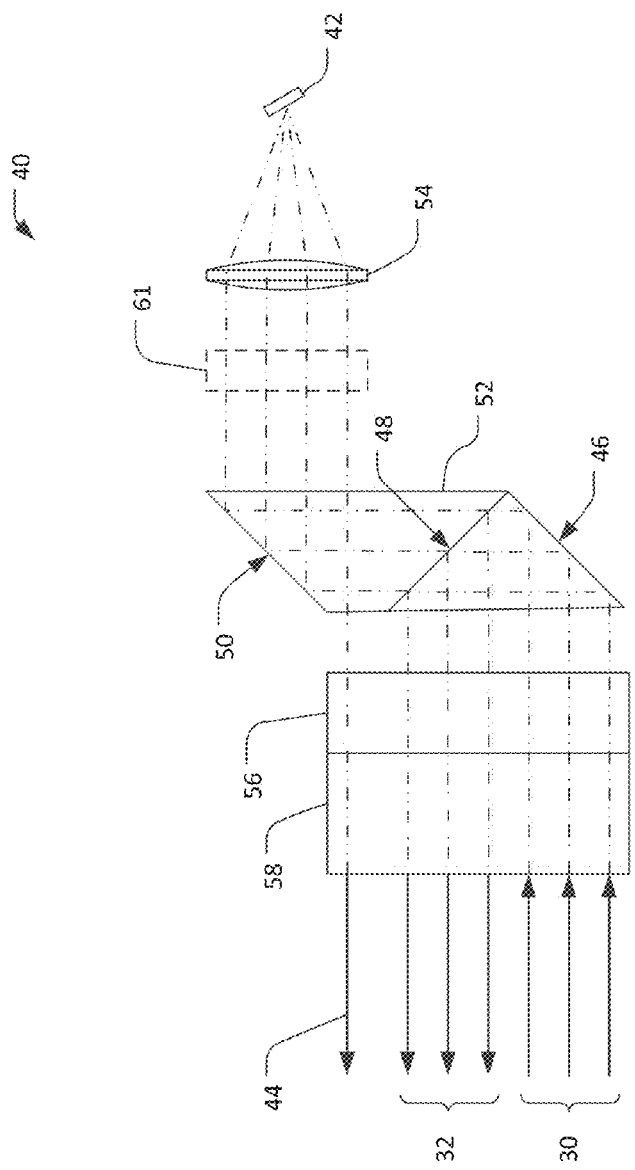
FIG. 3 is a schematic diagram of one embodiment of an optical subsystem of a monitoring module.

Referring to FIG. 3, an optical monitoring module 10 in accordance with the present invention may include an optical subsystem 40. In selected embodiments, an optical subsystem 40 may include a scanning mirror 42, a plurality of input fibers 30, a plurality of output fibers 32, at least one sample optical fiber 44 optically connected to a photodetector, a first reflective surface 46, and a second reflective surface 48. The first reflective surface 46 may receive light (e.g., optical signals in the form of multiple, discreet beams of light) from the input fibers 30. The first reflective surface 46 may reflect the light to the second reflective surface 48. The first reflective surface 46 may be a totally internally reflecting (TIR) surface or a coated surface to further compensate for polarization dependent loss (PDL).

In certain embodiments, the second reflective surface 48 may comprise a coating configured to split the various beams of light that reach it. Accordingly, after receiving the light from the first reflective surface 46, the second reflective surface 48 may reflect a first portion of the light into the output fibers 32 and pass a second portion thereof on to the scanning mirror 42. The scanning mirror 42 may reflect samples of the light incident thereon into one or more sample fibers 44 using time domain multiplexing (TDM).

The percentage of light tapped by the second reflective surface 48 may vary between embodiments. In selected embodiments, the percentage tapped may be relatively small. For example, the percentage tapped may be between about one and ten percent and preferably between about two and five percent. In one particular embodiment, the percentage tapped may be about five percent. Accordingly, in that particular embodiment, about ninety-five percent of the light entering a monitoring module 10 through the input fibers 30 may exit the monitoring module 10 through the output fibers 32.

In selected embodiments, an optical subsystem 40 may include a third reflective surface 50. The third reflective surface 50 may receive the light passing through the second reflective surface 48. The third reflective surface 50 may reflect this light to the scanning mirror 42. Like the first reflective surface 46, the third reflective surface 50 may be a TIR surface or a coated surface to further compensate for PDL in the pass through channels.

An optical subsystem 40 may also include a prism 52. The prism 52 may define and support the first, second, and third reflective surfaces 46, 48, 50 in a fixed relationship with respect to one another. Additionally, the prism 52 may provide the substrate surfaces onto which the first, second, and third reflective surfaces 46, 48, 50 may be deposited or adhere. Accordingly, the prism 52 and the first, second, and third reflective surfaces 46, 48, 50 may collectively form a beam splitting prism. As shown in the illustrated embodiment, samples of light may travel through the prism 52 at a location between the second and third reflective surfaces 48, 50 when passing from the scanning mirror to the at least one sample optical fiber 44.

An optical subsystem 40 may also include a focusing lens 54. The focusing lens 54 may be positioned optically between the third reflective surface 50 and the scanning mirror 42. Accordingly, the focusing lens 54 may focus the light received from the third reflective surface 50 onto the scanning mirror 42. Additionally, the focusing lens 54 may receive samples of light from the scanning mirror 42 and direct them through the prism 52 and into a corresponding sample fiber 44.

In certain embodiments, an optical subsystem 40 may include a fiber collimator array 56. A fiber collimator array 56 may include a fiber block 58, collimating lenses to collimate light exiting the input fibers 30, focusing lenses to focus light into the output fibers 32 and one or more sample fibers 44, or some combination thereof. In selected embodiments, a fiber block 58 may comprise a rigid component supporting in parallel all of the fibers 30, 32, 44 entering and exiting an optical monitoring module 10 in accordance with the present invention.

Within an optical subsystem 40, the respective orientations and distances among the various components may be selected to provide the desired result. For example, in selected embodiments, a prism 52 may be oriented at an angle of about 1.5 degrees with respect to the fiber collimator array 56 to avoid back reflection. In certain embodiments, a focusing lens 54 may have a focal length of about 60 mm. However, other lenses 54 having longer or shorting focal distances may be used. For example, a focusing lens 54 having a focal length of about 40 mm may be used to shorten the overall length of the corresponding monitoring module 10.

In selected embodiments, the input and output fibers 30, 32 may be single mode fibers (SMF). The sample fibers 44 may be SMF or multimode fibers (MMF). For example, within an optical subsystem 40, there may be some beam spot size mismatch due to differences in the optical path length. Accordingly, in selected embodiments, the sample fibers 44 may be MMF to lower the insertion loss.

In certain embodiments, a mask 61 may be positioned optically between a second reflective surface 48 and a focusing lens 54. For example, a mask 61 may be positioned optically between a third reflective surface 50 and a focusing lens 54. The inclusion or exclusion of a mask 61 may depend on the characteristics of certain fibers 44. For example, a mask 61 may be included certain embodiments where the sample fibers 44 are SMF.

Figure 4:
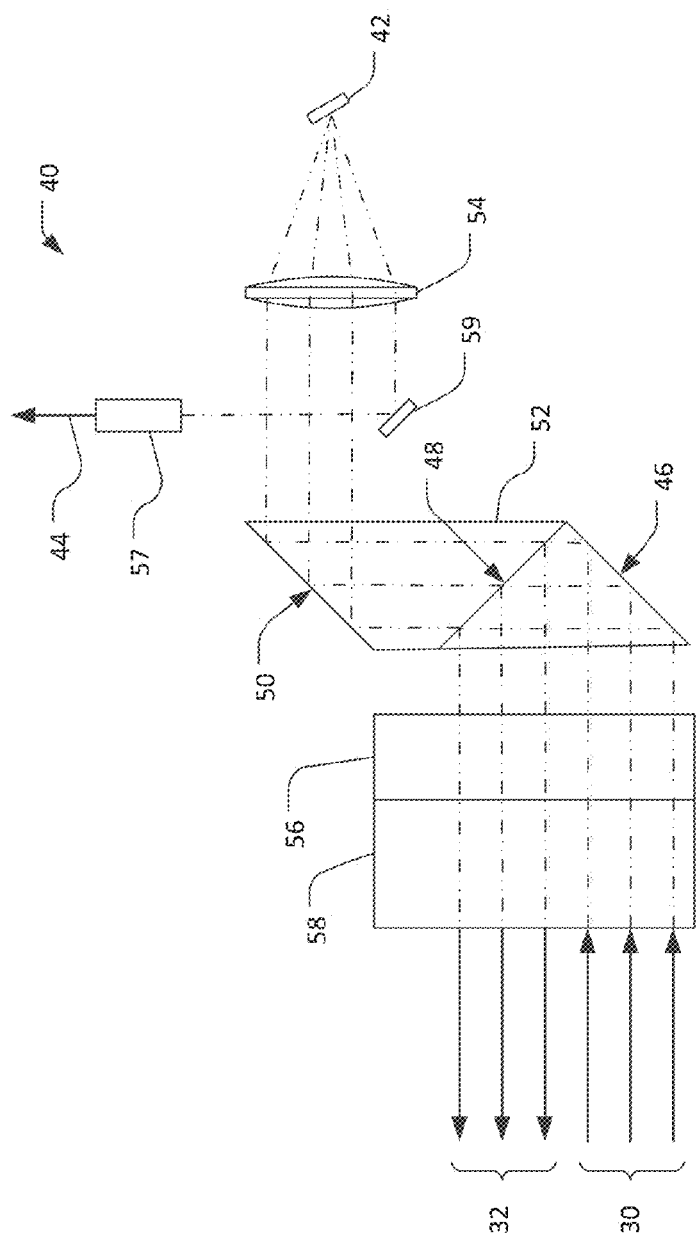
FIG. 4 is a schematic diagram of an alternative embodiment of an optical subsystem of a monitoring module.

Referring to FIG. 4, in selected embodiments, one or more sample fibers 44 may not correspond to a fiber collimator array 56 of the input and output fibers 30, 32. For example, one or more sample fibers 44 may be housed and supported by a separate fiber collimator array 57. In certain such embodiments, a pickoff mirror 59 may be used to direct samples into at least one sample fiber 44. Alternatively, a pickoff mirror 59 may be used to direct samples into one or more photodetectors.

Figure 5:
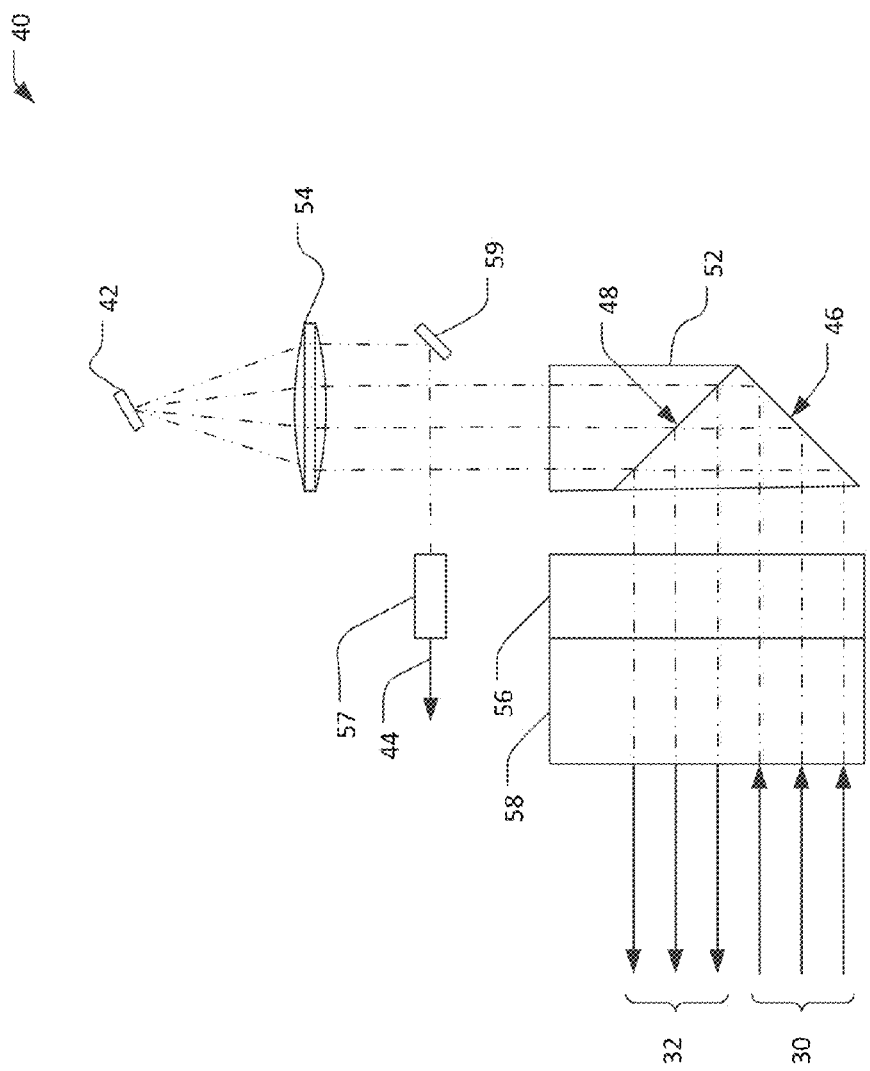
FIG. 5 is a schematic diagram of another alternative embodiment of an optical subsystem of a monitoring module.

Referring to FIG. 5, in selected embodiments, the third reflective surface 50 may be omitted. Accordingly, after receiving light from the first reflective surface 46, the second reflective surface 48 may reflect a first portion of the light into the output fibers 32 and pass a second portion thereof on to a focusing lens 54, scanning mirror 42, and the like.

In such embodiments, a pickoff mirror 59 may be used to direct samples into at least one sample fiber 44. For example, a pickoff mirror 59 may direct samples into one or more sample fibers 44 corresponding to a fiber collimator array 56 or fiber block 58. Alternatively, a pickoff mirror 59 may direct samples into one or more sample fibers 44 supported by a separate fiber collimator array 57, fiber block 57, combination thereof, or the like. In still other embodiments, a pickoff mirror 59 may direct samples into one or more photodetectors.

Figure 6:
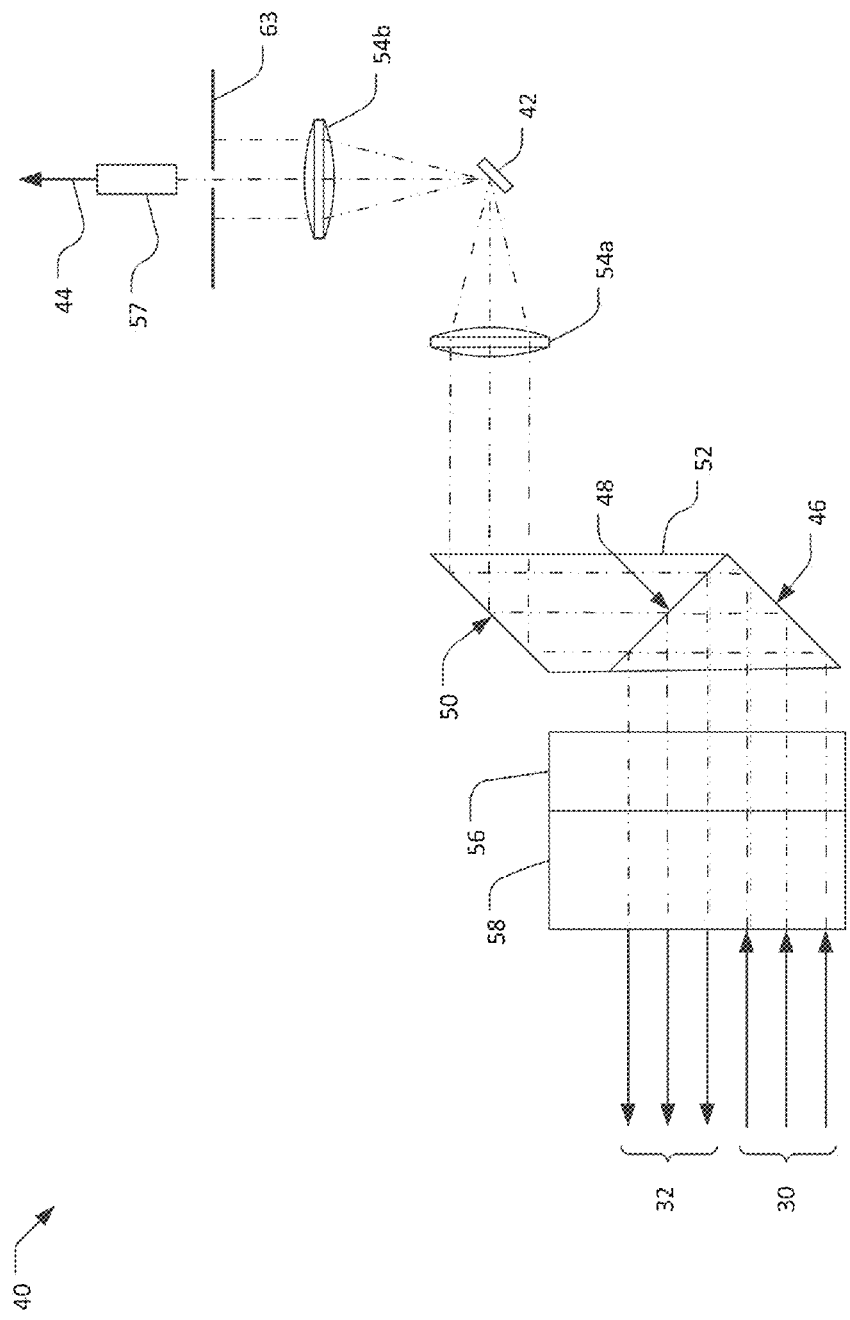
FIG. 6 is a schematic diagram of another alternative embodiment of an optical subsystem of a monitoring module.

Referring to FIG. 6, various scanning mirror and related or supporting optical arrangements are disclosed in U.S. Pat. No. 7,676,125, which is hereby incorporated by reference. Certain arrangements, components, or sub arrangements thereof may be used in one or more optical subsystems 40 in accordance with the present invention. For example, in selected embodiments, an optical subsystem 40 may include more than one focusing lens 54.

For example, an optical subsystem 40 may include two focusing lenses 54a, 54b. Accordingly, after receiving light from the first reflective surface 46, a second reflective surface 48 may reflect a first portion of the light into the output fibers 32 and pass a second portion thereof on to the first focusing lens 54a. The first focusing lens 54a may focus the light incident thereon onto a scanning mirror 42, which may reflect the light to the second focusing lens 54b.

In certain embodiments, a second focusing lens 54b may act as a collimator. Light passing through the second focusing lens 54b may be swept across a fiber collimator array 57 corresponding to one or more sample fibers 44. Alternatively, the light may be swept across one or more photodetectors. In selected embodiments, the light may be swept across an optional aperture plate 63 having an opaque shield with one or more non-opaque apertures defining a location of an active photodetector region that is designed to absorb light.

Figure 8:
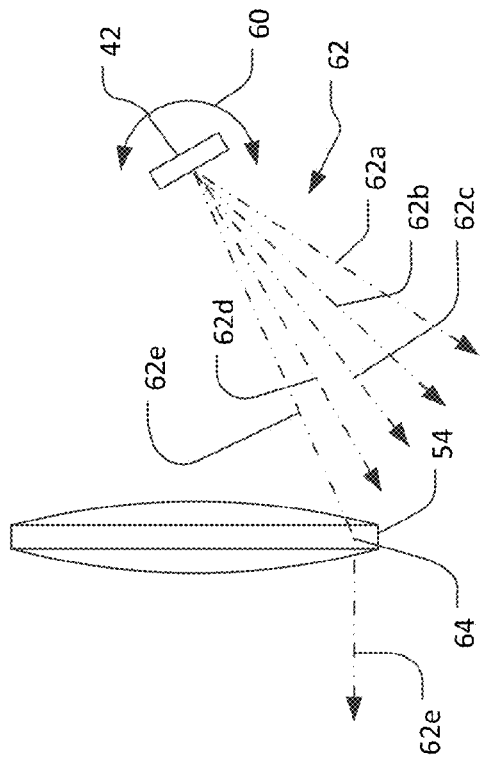
FIG. 8 is a schematic diagram illustrating the moment of time of FIG. 3 and showing the plurality of light beams being reflected from the scanning mirror, one of the light beams being directed along the particular path leading to a sample optical fiber.
Figure 7:
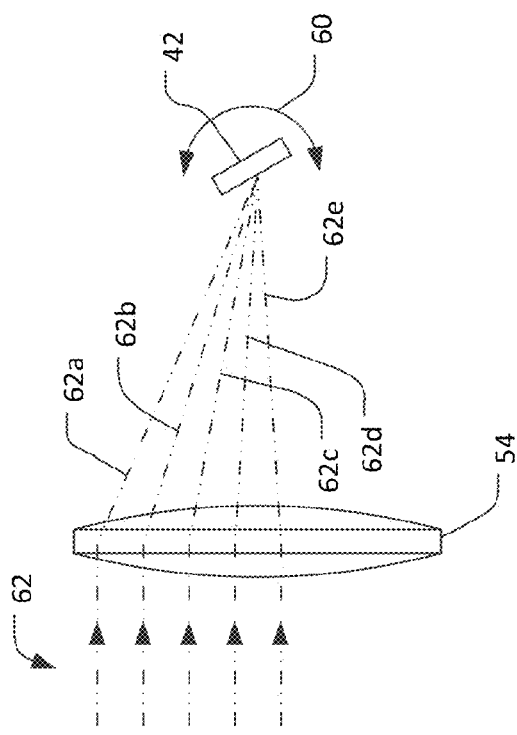
FIG. 7 is a schematic diagram illustrating a moment in time in which a focusing lens focuses a plurality of light beams onto a scanning mirror.

Referring to FIGS. 7 and 8, a scanning mirror 42 in accordance with the present invention may comprise a microelectromechanical system (MEMS) motivating the desired oscillation. In certain embodiments, the scanning mirror 42 may oscillate in only one dimension. Accordingly, the scanning mirror 42 may pivot 60 back and forth about a single axis. In the illustrated embodiment, that single axis extends perpendicularly with respect to the page.

At a particular moment in time within an optical subsystem 40, a plurality of discreet light beams 62 may reach a focusing lens 54. The beams 62 may originate from a particular row of input fibers 30. Before passing through the lens 54, the beams 62 may be collimated. However, as the beams 62 pass through the lens 54, they may be focused to converge onto the scanning mirror 42. In that the beams 62 converge onto the scanning mirror 42, they will diverge as they reflect off of the scanning mirror 42 and travel away therefrom. Thus, the beam 62a with the greatest angle of incidence will have the greatest angle of reflection. Conversely, the beam 62e with the smallest angle of incidence will have the smallest angle of reflection.

For the plurality of discreet light beams 62, only those that return through the lens 54 on a particular path 64 will be optically in line with a corresponding sample fiber 44. As a scanning mirror 42 oscillates, it may sweep the beams 62 back and forth across the path 64.

In the illustrated embodiment, one beam 62e is currently being reflected along the path 64. Accordingly, at the moment of time illustrated, the one beam 62e is being fed into the corresponding sample fiber 44. However, as the scanning mirror 42 oscillates, the one beam 62e may be swept out of alignment with the path 64. For a period of time thereafter, no beam 62 may be in alignment with the path 64. Eventually, another beam 62 (e.g., beam 62d) will be brought into alignment with the path and will be fed into the corresponding sample fiber 44. In selected embodiments, a monitoring module 10 may include one or more blocking surfaces, absorption surfaces, or the like, or combinations thereof to prevent unwanted interference by stray light beams (e.g., beams 62 being directed by a scanning mirror 42 to a location not along the path 64).

Accordingly, oscillations of the scanning mirror 42 may result in discreet samples, packets, or bursts of light being fed into a corresponding sample fiber 44. In the illustrated embodiment, as the scanning mirror pivots 60 clockwise, the corresponding sample fiber 44 may receive a discreet sample of light from one beam 62e, then another 62d, then another 62c, until it has received a sample from all of the beams 62. Then, as the scanning mirror 42 pivots back in the counter-clockwise direction, the corresponding sample fiber 44 may receive a discreet sample of light from one beam 62a, then another 62b, then another 62c, until it again receives a sample from all of the beams 62. This process may continue, enabling an optical subsystem 40 to collect samples from all of the input fibers 30.

Figure 9:
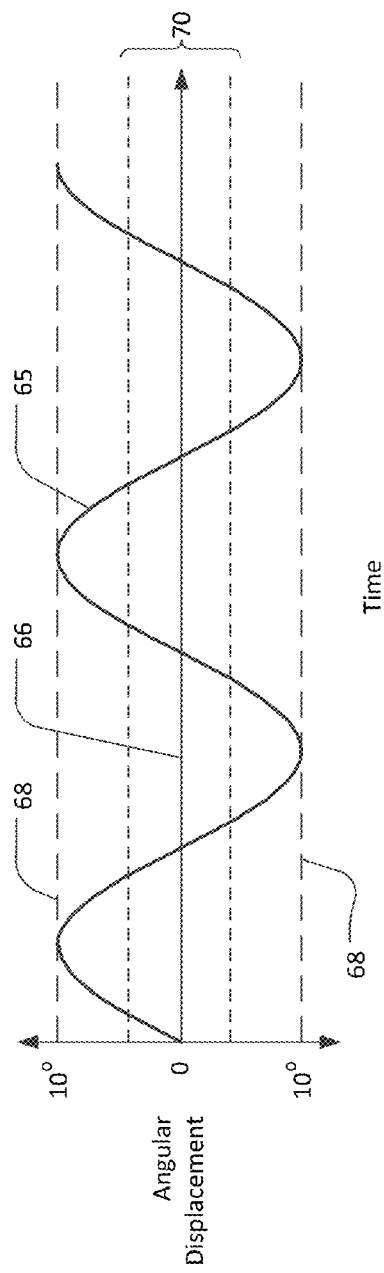
FIG. 9 is a graph plotting one embodiment of the angular displacement of a scanning mirror with respect to time.

Referring to FIG. 9, when plotted with respect to time and angular displacement a scanning mirror 42 may oscillate in any suitable pattern 65. For example, in selected embodiment, a scanning mirror 42 may oscillate in a sinusoidal pattern 65. Similarly, a scanning mirror 42 may oscillate through any suitable angular displacement at any suitable frequency. In certain embodiments, the scanning mirror 42 may have total displacement of about fifty degrees (e.g., twenty-five degrees on either side of a neutral or central position 66) and a frequency of about 450 to 550 Hertz.

Following a sinusoidal pattern, the angular velocity of a scanning mirror 42 may vary from zero at the extremes 68 to a maximum at the neutral or central position 66. Such changes in angular velocity may result in a scanning mirror 42 passing to a sample fiber 44 larger (e.g., longer) samples of certain beams 62 and smaller samples of others 62. To minimize the variance between samples, a scanning mirror 42 may be configured to reflect beams 62 into corresponding sample fibers 44 only within a certain band 70 of its displacement. This band 70 may correspond to a portion of the pattern 65 where the rate of change in angular displacement is contained within certain limits.

Figure 10:
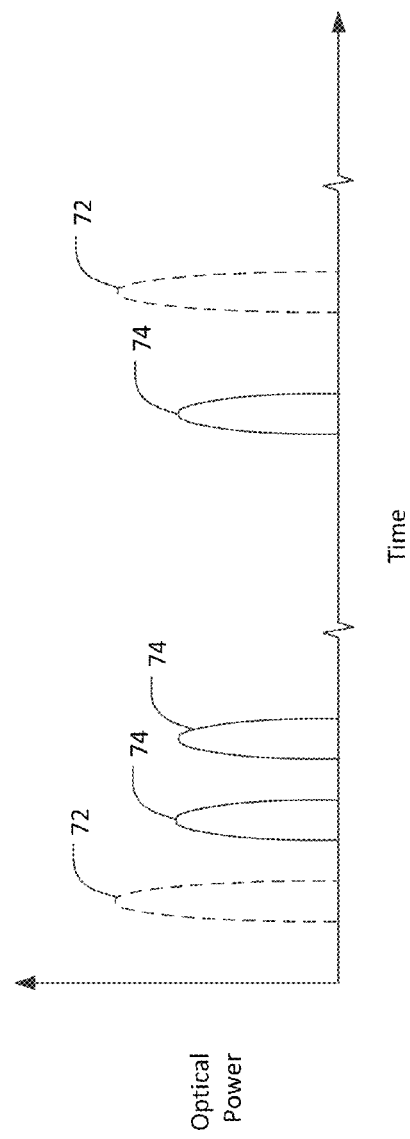
FIG. 10 is a graph plotting one embodiment of the optical power of a plurality of samples of light with respect to time.

Referring to FIG. 10, despite such efforts, certain samples may still be larger than others due to changes in the angular velocity of a scanning mirror 42. To provide further assistance in resolving such variances, a monitoring module 10 may use one or more optical indexing signals. Indexing signals may provide reference points in both space (e.g., relative position within the rows and columns of a fiber block 58) and time (e.g., time associated with the relative position within the rows and columns of the fiber block 58). Accordingly, indexing signals may provide feedback on the angular velocity of the scanning mirror and may assist in determining which samples correspond to which input fibers 30.

In selected embodiments, one or more input fibers 30 may deliver one or more optical indexing signals to an optical subsystem 40. Like the other optical signals delivered to an optical subsystem 40, indexing signals may be reflected by a first reflective surface 46, split by a second reflective surface 48, passed to a scanning mirror 42, and sampled into one or more sample fibers 44. Samples 72 of indexing signals may, however, be readily differentiated from samples 74 of the other optical signals. For example, the optical power of the samples 72 from indexing signals may be significantly greater than that of the samples 74 from other optical signals.

By noting when and how samples 72 of the indexing signals appear, information may be derived regarding the position and velocity of a corresponding scanning mirror 42. Such information may be used for synchronizing and phase locking the scanning mirror 42. In selected embodiments, synchronization and phase locking the scanning mirror 42 may facilitate generation of time reference signals for quantifying optical power on the input fibers 30.

Figure 11:
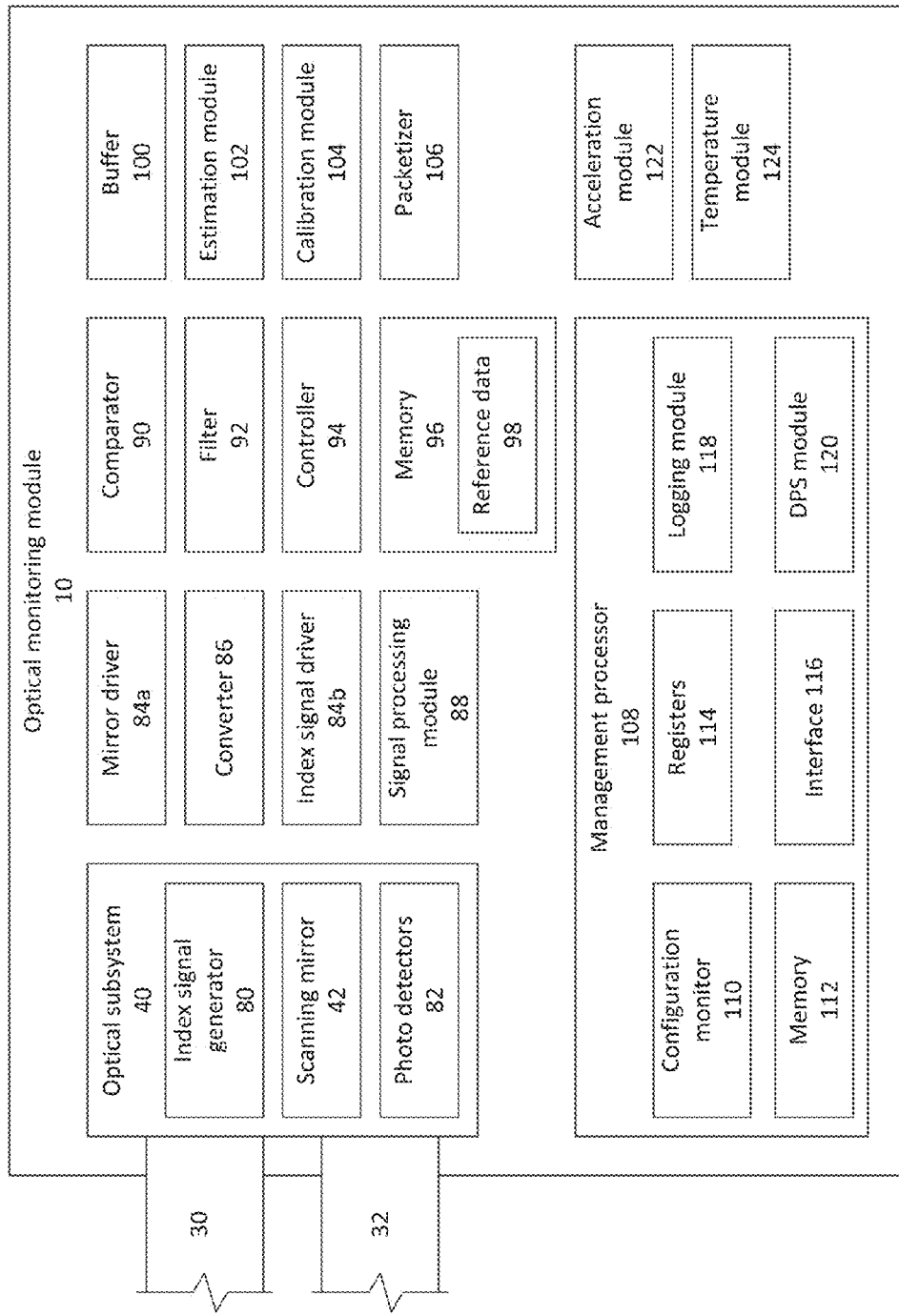
FIG. 11 is a schematic block diagram of one embodiment of an optical monitoring module.

Referring to FIG. 11, a monitoring module 10 in accordance with the present invention may include any suitable arrangement of supporting electronic hardware, software, or combinations thereof. The following description discloses certain modules or components that may be included within selected embodiments of a monitoring module 10. However, it is to be understood that various modules or components disclosed may be omitted as desired.

In selected embodiments, a monitoring module 10 (e.g., an optical subsystem 40 of a monitoring module 10) may include one or more index signals generators 80. An index signal generator 80 may output index signals supporting scanning mirror control and channel indexing (e.g., synchronizing and phase locking of a scanning mirror 42). In certain embodiments, one or more index signal generators 80 may comprise a laser emitting a beam having a wave length of about 1310 nm. A front accessible test laser may also be provided for the convenience of system diagnostics. A monitoring module 10 may be configured to support connection with an external laser to provide laser testing.

In certain embodiments, an optical monitoring module 10 may be characterized as a free space, integrated, optical tap, multi-port power detection module with a one-dimensional MEMS scanning mirror 42 and one or more pigtailed photodetectors 82. A monitoring module 10 may split collimated beams into signal paths, which may exit through the output fibers 32, and tapped paths, which may be scanning by the scanning mirror 42 through one or more sample fiber 44 to the corresponding photodetectors 82. The hardware of a monitoring module 10 may include the optical subsystem 40 to perform free space optical beam splitting, TDM beam scanning, and index signal generation, as well as electronics to measure the optical power, control the scanning mirror, and interface with Gigabit Ethernet, I2C, DPRAM, RS232, or the like, and mechanics (e.g., structures, housings) to support the optics and electronics.

Embodiments in accordance with the present invention may include hardware, software, or combinations of hardware and software that may each generally be referred to herein as a "module," "system," or the like. Computer program code for carrying out operations of the present invention may be written in any combination of one or more programming languages, including an object-oriented programming language such as Java, Smalltalk, C++, or the like and conventional procedural programming languages, such as the "C" programming language or similar programming languages.

The program code may execute entirely or partially on the hardware of a monitoring module 10, entirely or partly on the hardware of a switch controller 34, or entirely or partly on the hardware of an external controller 36. In the latter scenario, the external controller 36 may be connected to the monitoring module 10, switch controller 34, or both through any type of network, including a local area network (LAN) or a wide area network (WAN), or the connection may be made in some other manner. For example, the connection may be made through the Internet using an Internet Service Provider.

In selected embodiments, a monitoring module 10 may include one or more drivers 84. For example, a monitoring module 10 may include a mirror driver 84a providing the current, voltage, or the like necessary to drive the scanning mirror 42 at the desired frequency. A monitoring module 10 may also include an index signal driver 84b. An index signal driver 84b may instruct a index signal generator 80 what index signals to produce and when.

A monitoring module 10 may include a converter 86. A converter 86 may operate in conjunction with or include one or more photodetectors 82 to convert light energy to electrical signals. The electrical signals may communicate information in terms of current or voltage. For example, in selected embodiments, light may be directed through a sample fiber 44 to a photodetector 82. The photodetector 82 may convert the light energy to a current output.

A converter 86 may include one or more amplifiers. The amplifiers may have programmable gain (e.g., an amplification factor). Accordingly, an amplifier may amplify or magnify the current output of a photodetector 82 and convert it to a voltage signal or current signal at its output. The voltage or current signal may be representative of the light energy and, therefore, optical power.

In selected embodiments, one or more amplifiers of a converter 86 may also be pre-amplifiers whose output may subsequently be fed to other amplifiers for further amplification and filtering. The amplifiers of a converter 86 may be linear or logarithmic in nature to provide the desired dynamic range and signal-to-noise ratio. In certain embodiments, a converter 86 may include one or more amplifiers known as transimpedance amplifiers that convert a current output of the photodetectors 82 to a voltage output. In one embodiment, one or more amplifiers may be linear transimpedance amplifiers.

A monitoring module 10 may include a signal processing module 88. A signal processing module 88 may receive the voltage or the current output signals from a converter 86. A signal processing module 88 may process such signals to provide information on the position and angular velocity of a scanning mirror 42. Such information may used by other components within a monitoring module 10. For example, the information may be used by a comparator 90, filter 92, controller 94, or some combination thereof. Such information may also be used to determine optical power present on individual fiber channels observed by a monitoring module 10.

To determine the position and velocity of a scanning mirror 42, certain known incoming fiber channels may be reserved as index channels. In selected embodiments, a signal processing module 88 may decode the index signals received on such channels to extract the space and time reference information required for synchronization and phase locking. An index channel decoder within a signal processing module 88 may be implemented using either analog signal processing or digital signal processing of the information derived from the index channels. In selected embodiments, an index channel decoder may be implemented using a mix of analog and digital signal processing, where the digital signal processing has certain programmable parameters. In certain embodiments, the functionality of an index channel decoder may be split over various components within a monitoring module 10 to achieve the desired outcome.

In selected embodiments, a signal processing module 88 may also include an analog-to-digital converter and a filter. The analog-to-digital converter within a signal processing module 88 may convert the electrical output of a converter 86 to discrete time digital signal representative of the electrical output of the amplifiers, and hence the optical power of various input and index channels delivered by the input fibers 30. A filter within a signal processing module 88 may remove unwanted noise from the digital signal.

The filter of a signal processing module 88 may also provide further processing to match and correlate the digital signals such that the information required by the index channel decoder is made available for synchronization and phase locking of the scanning mirror 42. The filter may also process digital signals specific to the input channels.

A scanning mirror 42 may be run in a closed-loop feedback control to achieve the desired synchronization and phase locking. In selected embodiments, a monitoring module 10 may include memory 96 storing reference values 98 or data for the desired frequency, phase, and amplitude of the scanning mirror 42. This reference data may be compared by a comparator 90 to the frequency, phase, and amplitude information output by an index channel decoder (e.g., an index channel decoder within a signal processing module 88). A comparison output by a comparator 90 may be fed to a filter 92 and controller 94, which may implement a control algorithm for the closed-loop feedback control. The filter 92 may filter out unwanted noise and shape the frequency response of the control-loop.

A controller 94 may be a programmable computation engine implementing the closed-loop feedback control of a scanning mirror 42. Accordingly, a controller 94 may control: (a) generation of a control signal (e.g., sine wave or square wave) for the scanning mirror 42 using a control signal generator (e.g., mirror driver 84a); (b) the parameters (e.g., amplitude, frequency, phase, and DC offset) of the control signal generator to achieve the closed-loop feedback control; (c) the values of the parameters of the control signal generator; and (d) processing of the digital data streams received from a signal processing module 88, which data streams are representative of the optical power for the input channels. In selected embodiments, processes controlled by a controller 94 may include steps as simple as assigning timestamps to digital data streams for further processing by other components (e.g., buffer 100) of a monitoring module 10.

The closed-loop feedback control implemented by a controller 94 may be of proportional integral derivative (PID) form with programmable gains or a linear quadratic regulatory (LQR) form with programmable coefficients. In selected embodiments, control may be implemented in a linear quadratic Gaussian (LQF) form (e.g., a Kalman filter where noise and uncertainty of the index channel timing may be an issue).

In certain embodiments, a controller 94 may be implemented on a field programmable gate array (FPGA) to perform the functions described hereinabove. A controller 94 may also be provided with program and data memory (e.g., memory 96) in the form of random access memory (RAM) (e.g., SDRAM or DDR RAM), read only memory (ROM), electrically erasable programmable ROM (EEPROM) (e.g., FLASH memory), or some combination thereof. The program and data memory may be used in conjunction with a FPGA to implement the controller 94. In certain alternative embodiments, a controller 94 may be implemented on an embedded microprocessor or a microcontroller with the program and data memory. A digital signal processor (DSP) may also be used as a controller 94, and may be preferred over an embedded processor or a microcontroller in certain circumstances.

A controller 94 may provide the control signal for a mirror driver 84a. A mirror driver 84a may amplify and filter the control signal to generate the required voltage and current levels used to drive the scanning mirror 42. A controller 94 may also receive local feedback information from a mirror driver 84a (e.g., current feedback, which may be representative of a physical parameter of a scanning mirror 42 in operation). Feedback from a mirror driver 84a may be useful in controlling a scanning mirror 42 optimally and as desired. This feedback may be used in conjunction with the feedback information received by a controller 94 from a signal processing module 88.

In selected embodiments, a monitoring module 10 may include a buffer 100. A buffer 100 may further processes data received from a controller 94. For example, a buffer 100 may store (e.g., buffer) and multiplex data received from a controller 94 in preparation for further processing by an estimation module 102. Buffering and multiplexing may be necessary to organize sampled data (e.g., data representative of the optical power on the input channels) for calculation of power values.

A buffer 100 may assign timestamps or relative time references to the buffered data. This may assist an estimation module 102 in further processing the data. In selected embodiments, time stamping may be accomplished by assigning distinct time slots to the sampled data and synchronizing the processing of the data by subsequent components (e.g., estimation module 102, calibration module 104, and packetizer 106) within a monitoring module 10. A buffer 100 may include certain programmable options such as changing the size of one or more storage locations, changing the multiplexing sequence, and decimation of the sampled data stream for the input channels.

A monitoring module 10 may include an estimation module 102. An estimation module 102 may be a programmable construct that receives sampled data from a buffer 100 and estimates the optical power values for a given channel by using filters (e.g., a matched filter or other estimation technique). Alternatively, the estimation techniques employed by an estimation module 102 may be comparatively simple techniques such as averaging a sequence of power samples for a particular input channel or determining the peak power value for a particular input channel.

A monitoring module 10 may include a calibration module 104. An The calibration module 104 may be a programmable construct to calibrate the measured power received from an estimation module 102. Calibration may be achieved by using curve fitting techniques to provide calibrated values for the measured power over a given range (e.g., the dynamic range) of power measurement values. The calibration module 104 may also provide scaled values of the measured power in different number formats (e.g., fixed point or floating point), which may be output to a packetizer 106.

In selected embodiments, a monitoring module 10 may include a packetizer 106. A packetizer 106 may be a programmable construct that buffers and stores the scaled power values in packets of data values, where packet size may be a programmable option. The data packets may be subsequently transported to a consumer of the data (e.g., a switch controller 34, external controller 36) at a preset rate, which rate may also be programmable option of the packetizer 106.

A monitoring module 10 may include a management processor 108. A management processor 108 may provide overall configuration, management, and system logging for a monitoring module 10. Different configuration options may be implemented by or through a configuration module 110 of the management processor 108, depending on the programmable options that exist within the various modules or components of a monitoring module 10.

In selected embodiments, a management processor 108 may be implemented as an embedded microprocessor or microcontroller with memory 112 (e.g., RAM and ROM) and programmable registers 114. Such registers 114 may be the general purpose registers of the microprocessor and the special purpose registers storing the system configuration information for a monitoring module 10. In selected embodiments, the special purpose registers may mainly reside on a FPGA and communicate with the embedded microprocessor. The microprocessor itself may be a discrete chip or an embedded soft-core or a hard-core processor on the FPGA with memory and registers.

In certain embodiments, a management processor 108 may include an interface 116 receiving external inputs using standard serial or parallel interfaces. An interface 110 may comprise an RS232 serial interface, an Ethernet interface, a parallel port interface, a universal serial bus (USB) interface, or the like. External inputs may comprise commands or messages to a monitoring module 10 to configure it in a given state or to check the status thereof by accessing a logging module 118. In selected embodiments, a management processor 108 may include a distributed problem solving (DPS) module 120. A DPS module 120 may assist other modules or components of a monitoring module 10 in the processing of the sampled data. In selected embodiments, such assistance may take the form of power value conversion from linear to logarithmic scale before a packetizer 106 sends the data out.

In selected embodiments, a monitoring module 10 may include an acceleration module 122, a temperature module 124, or both. An acceleration module 122 may support suspension of additional measurements if excessive acceleration of the monitoring module 10 is detected. A temperature module 124 may provide environmental feedback for a monitoring module 10 and allow for temperature compensation of power measurement. Acceleration and temperature feedback provided by such modules 122, 124 may be used by a controller 94 to compensate for environmental changes of a monitoring module 10 by adjusting the control of a scanning mirror 42.

Figure 12:
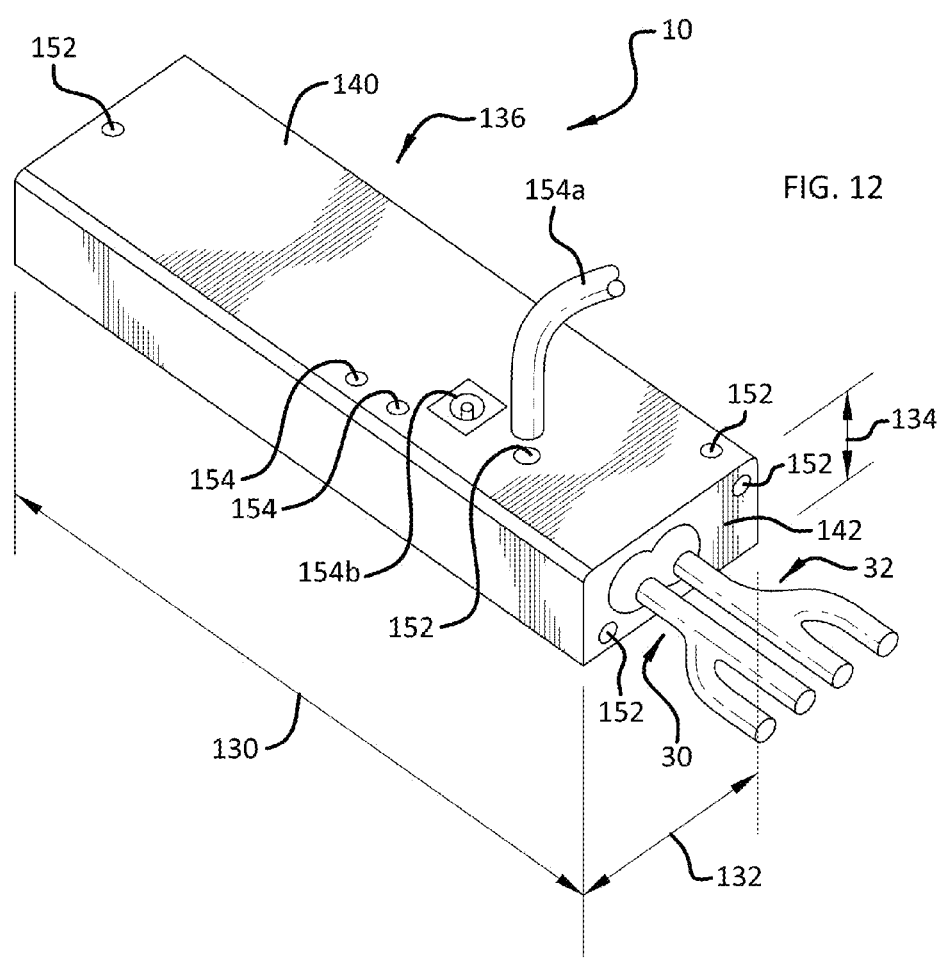
FIG. 12 is a perspective view of one embodiment of an assembled optical monitoring module.
Figure 13:
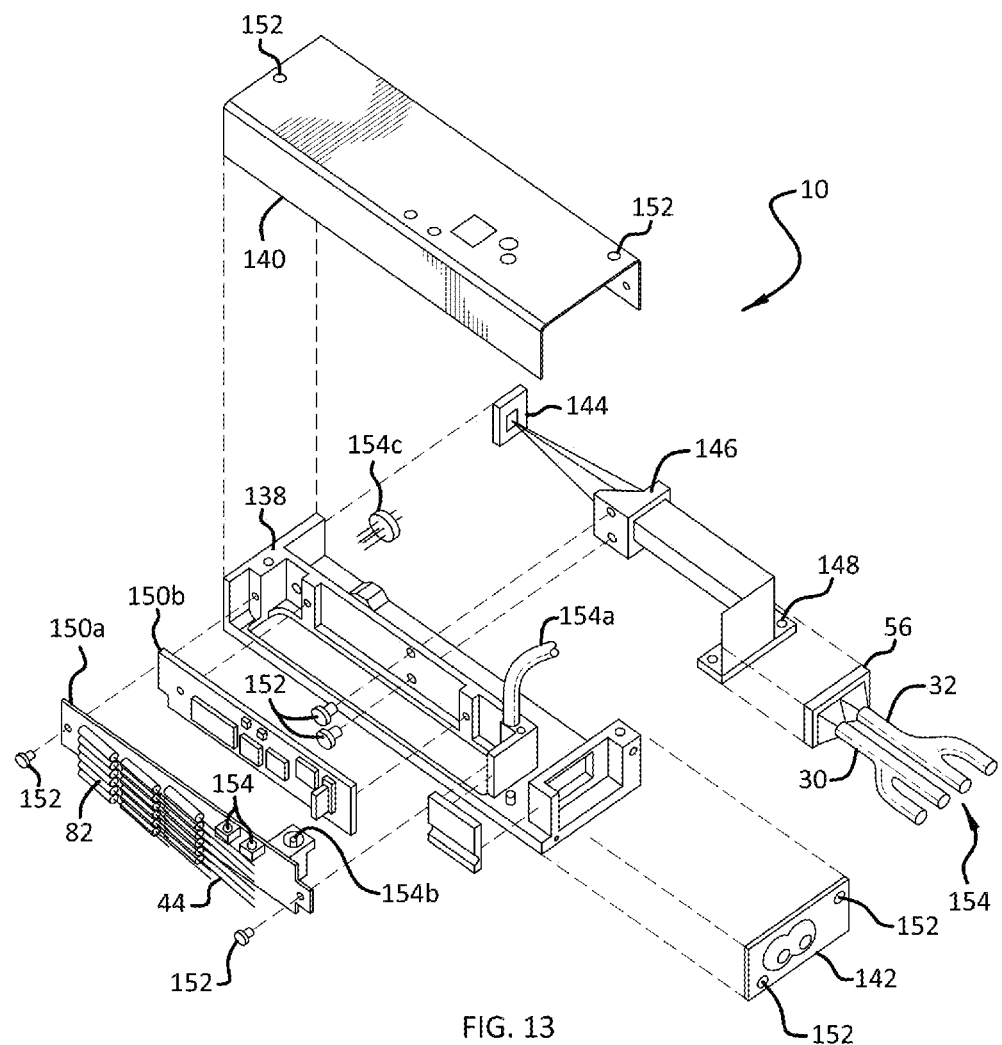
FIG. 13 is an exploded, perspective view of the optical monitoring module of FIG. 8.

Referring to FIGS. 12 and 13, a monitoring module 10 in accordance with the present invention may be manufactured in various shapes and sizes. In selected embodiments and to a certain degree, a smaller monitoring module 10 may be more desirable. In the illustrated embodiment, the monitoring module 10 has a length 130 of about 146 mm a width 132 of about 45 mm, and a height 134 of about 25 mm.

A monitoring module 10 may include a housing 136 containing, supporting, and protecting the various hardware components thereof. In selected embodiments, a housing 136 may include a base 138, a top cover 140, and at least one end cover 142. A base 138 may provide a heat sink or heat conductor for removing heat from the hardware components of a monitoring module 10. A base 138 may also provide locations for securing the various hardware components of a monitoring module 10.

For example, a base 138 may provide a substantially rigid structure holding an assembly 144 supporting a scanning mirror 42, an assembly 146 supporting a focusing lens 54, an assembly 148 supporting a prism 52, and a fiber collimator array 56 in a desired relationship with respect to one another. A base 138 may also provide a structure holding or supporting one or more circuit boards 150. For example, a base 138 may support an analog board assembly 150a and a digital board assembly 150b. Various fasteners 152, connections, welds, bonding agents, or the like may secure the various components of a monitoring module 10 together.

A monitoring module 10 may include devices 154 interfacing with components exterior thereto. Such devices 154 may support the passing of electrical power, light, data, and the like into and out of a monitoring module 10. For example, as discussed hereinabove, such devices 154 may include various optical fibers 30, 32 conducting light to and from the monitoring module 10. Such devices 154 may also include one or more power ports or receptacles 154b, communication ports, data cables 154a, feed thru devices 154c, or the like or some combination thereof.

Figure 14:
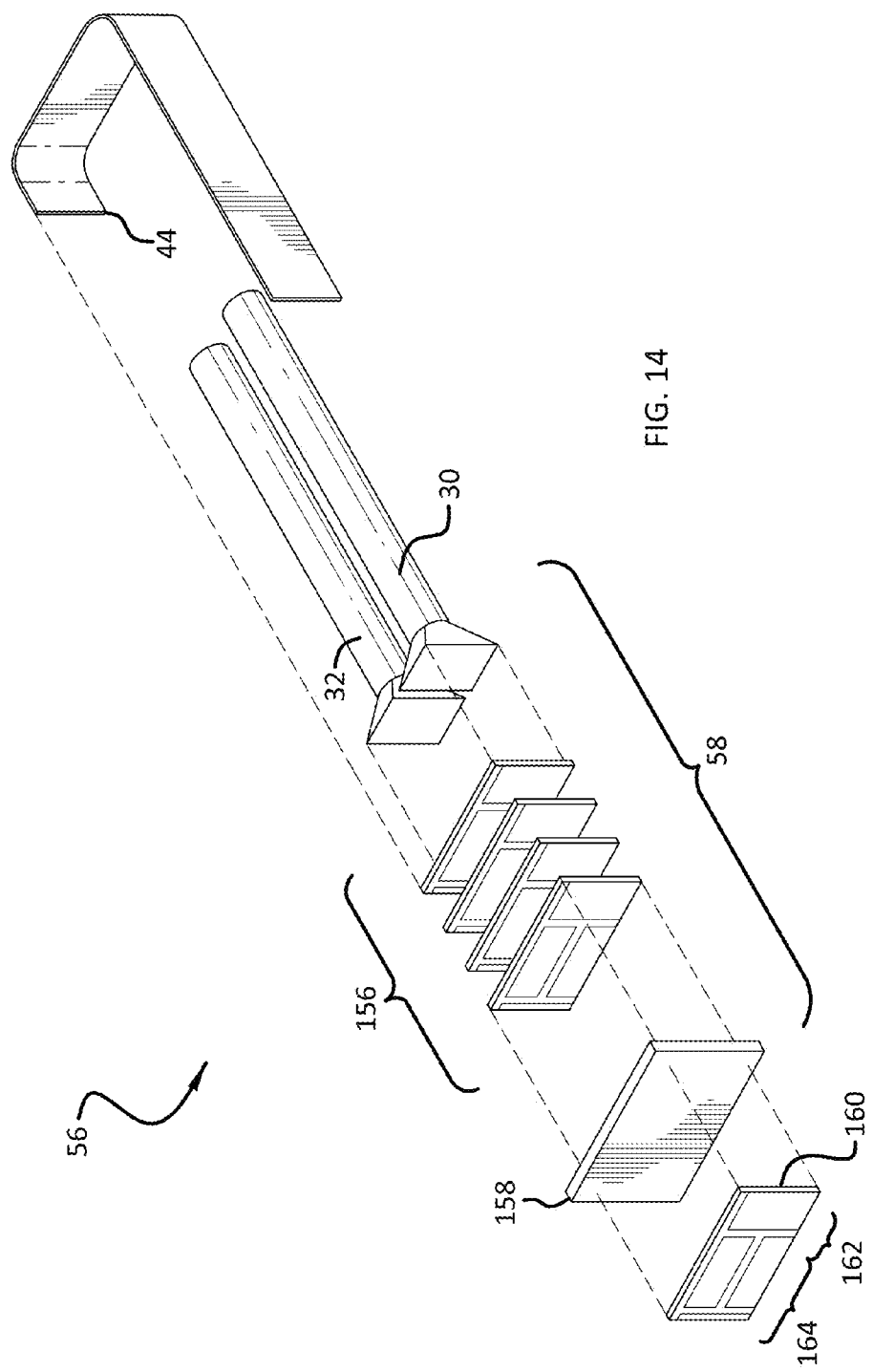
FIG. 14 is an exploded, perspective view of the fiber collimator array of FIG. 9.

Referring to FIG. 14, a fiber collimator array 56 in accordance with the present invention may have any suitable configuration. In selected embodiments, a fiber collimator array 56 may include one or more face plates 156, a spacer 158 (e.g., glass spacer 158), and an array 160 of lenses. One or more of the face plates 156 may have apertures extending therethrough to receive optical fibers (e.g., input fibers 30, output fibers 32, sample fibers 44) therewithin. Face plates 156 may assist in properly aligning the optical fibers 30, 32, 44. Epoxy may be used to secure the fibers 30, 32, 44 within the apertures of the one or more face plates 156.

The lenses within an array 160 may perform different functions depending on which direction light is passing therethrough. In selected embodiments, an array 160 may be divided into a plurality of collimating lenses 162 and a plurality of focusing lenses 164. The collimating lenses 162 and the focusing lenses 164 may be substantially identical to one another. However, due to the direction of light passing therethrough, the collimating lenses 162 may collimate the light, while the focusing lenses 164 may focus the light (e.g., converge the light into respective output fibers 32). A spacer 158 may ensure that the distance between the ends of the fibers 30, 32, 44 and the corresponding lenses 162, 164 within the array 160 is optically proper (e.g., supports the desired optical behavior).

Figure 15:
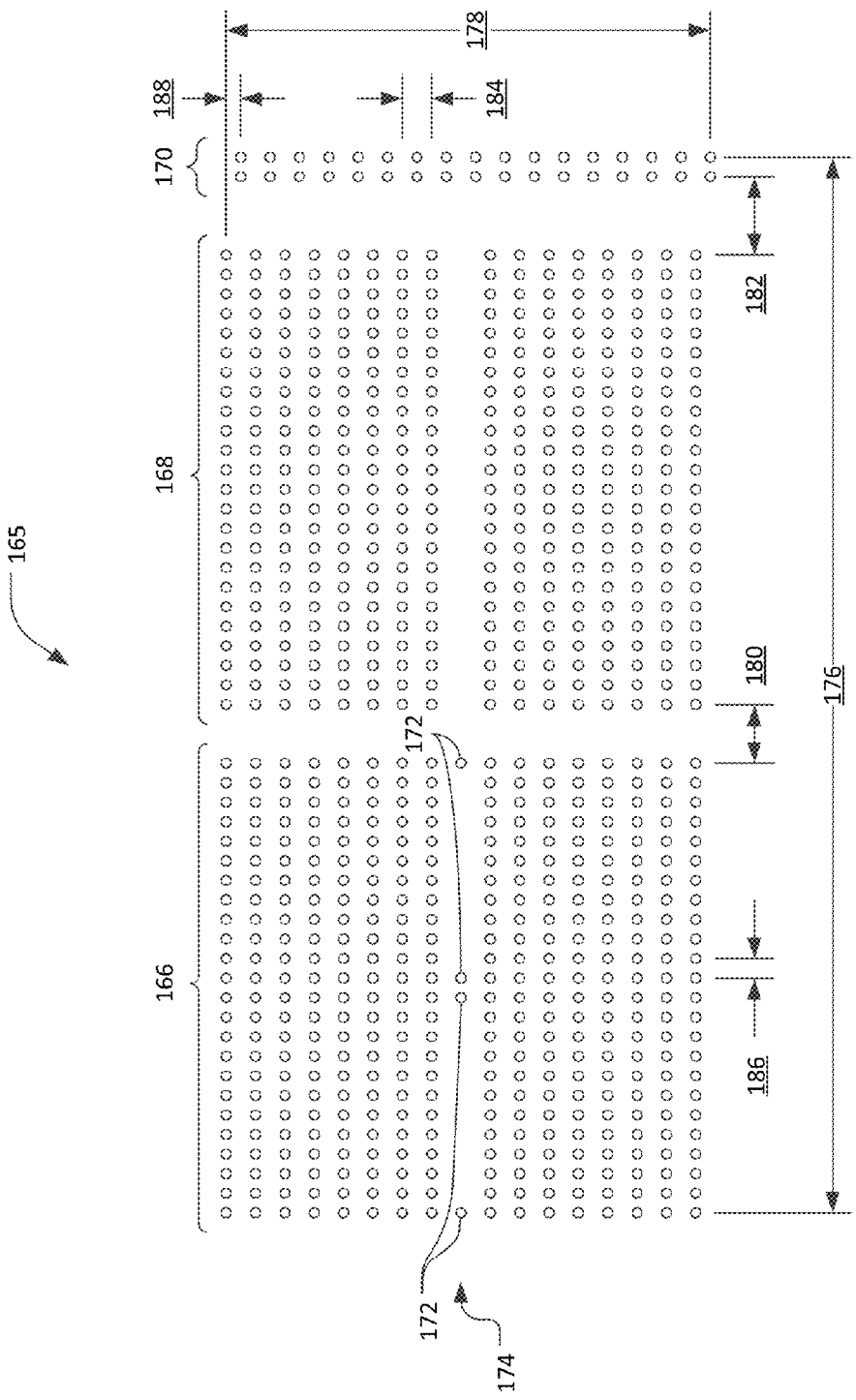
FIG. 15 is a view of one embodiment of the insertion side of a fiber block arrangement.

Referring to FIG. 15, a fiber block 58 may support fibers 30, 32, 44 in any suitable arrangement 165. In selected embodiments, a fiber block 58 may support a one-dimensional arrangement 165 of fibers 30, 32, 44 (e.g., a single row of fibers 30, 32, 44). In other embodiments, a fiber block 58 may support a two-dimensional arrangement 165 of fibers 30, 32, 44 (e.g., multiple rows or columns of fibers 30, 32, 44).

For example, in the illustrated embodiment, the fiber block 58 supports a two-dimensional arrangement 165 comprising four hundred eight apertures 166 for input fibers 30, three hundred eighty-four apertures 168 for output fibers 32, and thirty-four apertures 170 for sample fibers 44. Within the input apertures 166 may be those 172 reserved for input fibers 30 delivering indexing signals. For example, in the illustrated embodiment, a center row 174 of apertures 166 may house one or more (e.g., four) input fibers 30 delivering indexing signals. In selected embodiments, the output apertures 168 may have not a corresponding center row since the indexing signals are for use by a monitoring module 10 and need not be passed on to subsequent components.

In certain embodiments, the arrangement 165 of a fiber block 58 may support selected redundancies. For example, in the illustrated embodiment, the arrangement 165 includes two columns of apertures 170 for receiving sample fibers 44 (e.g., MMF sample fibers 44). Accordingly, there may be two sample fibers 44 per row. Should one of the sample fibers 44 fail to operate as desired or required, samples may still be passed through the neighboring sample fiber 44 located in the same row.

The arrangement 165 of a fiber block 58 may have any suitable dimensions, spacings, offsets, and the like. As shown in the illustrated embodiment, the normal beam from the fiber block 58 may have a beam spot side of about 160 μm and a waste location about 10 mm away from the fiber block. The fiber position errors may be about plus or minus 1 μm.

Additionally, as shown in the illustrated embodiment, an arrangement 165 may have a total width 176 of about 22 mm (e.g., about 21.96 mm) and a total height 178 of about 12 mm (e.g., 12.24 mm). The spacing 180 between the input apertures 166 and the output apertures 168 may be about 2 mm (e.g., 2.16 mm). The spacing 182 between the output apertures 168 and the sample apertures 170 may be about 3 mm (e.g., 2.88 mm). The spacing 184 between rows of the apertures 166, 168, 170 may be about 1 mm (e.g., 0.72 mm). The spacing 186 between columns of the apertures 166, 168, 170 may be less than 1 mm (e.g., about 0.36 mm). To reduce back reflection, an offset 188 between rows of the input and output apertures 166, 168 and the rows of sample apertures 170 may be less than 1 mm (e.g., about 0.36 mm).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An optical device providing multi-channel bulk optical power monitoring, comprising:
    a fiber block securing a plurality of input optical fibers, a plurality of output optical fibers, and one or more sample optical fibers in an arrangement of rows and columns, each of the one or more sample optical fibers connected to a respective photodetector;
    a prism facing the fiber block, the prism comprising first, second, and third reflective surfaces; and
    a scanning mirror external to the prism, wherein
        the first reflective surface reflects light from the input optical fibers to the second reflective surface,
        the second reflective surface reflects a first portion of the light from each input optical fiber into a respective one of the output optical fibers and passes a second portion of the light from each input optical fiber to the third reflective surface,
        the third reflective surface reflects the second portion of the light from each input optical fiber to the scanning mirror, and
        the scanning mirror is configured to oscillate about a rotation axis to sequentially reflect the second portion of the light from each input optical fiber into the one or more sample optical fibers.

2. An optical device according to claim 1, further comprising a collimator array positioned optically between the fiber block and the prism.

3. An optical device according to claim 1, wherein at least one of the plurality of input optical fibers delivers indexing light configured to generate space and time information.

4. An optical device according to claim 3, wherein the scanning mirror is synchronized and phase locked in accordance with the space and time information.

5. An optical device according to claim 3, wherein the space information relates to a relative position of each fiber of the plurality of input optical fibers within the arrangement of rows and columns.

6. An optical device according to claim 3, wherein:
the one or more sample optical fibers comprises a plurality of sample optical fibers; and
the fiber block further secures the plurality of sample fibers in the arrangement of rows and columns.

7. An optical device according to claim 1, wherein light reflected from the scanning mirror to the one or more sample optical fibers travels through the prism.

8. An optical device according to claim 7, further comprising a focusing lens positioned optically between the third reflective surface and the scanning mirror.

9. An optical device according to claim 8, wherein the focusing lens focuses the second portion of light onto the scanning mirror.

10. An optical device according to claim 9, wherein the focusing lens receives the light reflected from the scanning mirror and directs the light reflected from the scanning mirror through the prism and into the one or more sample optical fibers.

11. A method of monitoring optical power, comprising:
receiving, by a prism, light from a plurality of input optical fibers secured in a fiber block in an arrangement of rows and columns;
reflecting, by a first reflective surface of the prism, the light to a second reflective surface of the prism;
reflecting, by the second reflective surface, a first portion of the light from each input optical fiber into a respective one of a plurality of output fibers secured in the fiber block in the arrangement of rows and columns;
passing, by the second reflective surface, a second portion of the light from each input optical fiber to a third reflecting surface of the prism;
reflecting, by the third reflecting surface, the second portion of the light from each input optical fiber to a scanning mirror;
oscillating the scanning mirror about a rotation axis to sequentially reflect the second portion of the light from each input optical fiber into at least one sample optical fiber secured in the fiber block in the arrangement of rows and columns; and
conducting, by each of the at least one sample optical fiber, light reflected by the scanning mirror to a respective photodetector.

12. A method according to claim 11, further comprising collimating the light as it passes from the plurality of input optical fibers to the prism.

13. A method according to claim 11, further comprising delivering indexing light by at least one fiber of the plurality of input optical fibers.

14. A method according to claim 13, further comprising: using the indexing light generating space and time information; and using the space and time information to synchronize and phase lock the scanning mirror.

15. A method according to claim 13, wherein the space information relates to a relative position of each fiber of the plurality of input optical fibers within the arrangement of rows and columns.

* * * * *